US012663013B2

(12) United States Patent
Chang et al.

(10) Patent No.: US 12,663,013 B2
(45) Date of Patent: Jun. 23, 2026

(54) MAGNETICALLY ATTRACTED FAN SET

(71) Applicant: SEA SONIC ELECTRONICS CO., LTD., Taipei (TW)

(72) Inventors: Hsiu-Cheng Chang, Taipei (TW); Cheng-Ting Chu, Taipei (TW)

(73) Assignee: SEA SONIC ELECTRONICS CO., LTD., Taipei City (TW)

( * ) Notice: Subject to any disclaimer, the term of this patent is extended or adjusted under 35 U.S.C. 154(b) by 148 days.

(21) Appl. No.: 17/329,656

(22) Filed: May 25, 2021

(65) Prior Publication Data

US 2022/0381253 A1 Dec. 1, 2022

(51) Int. Cl.

*F04D 25/16* (2006.01)
*F04D 25/08* (2006.01)
*F04D 29/40* (2006.01)
*F04D 29/64* (2006.01)

(52) U.S. Cl.

CPC ........... *F04D 25/166* (2013.01); *F04D 25/08* (2013.01); *F04D 29/403* (2013.01); *F04D 29/646* (2013.01); *F05D 2260/32* (2013.01)

(58) Field of Classification Search

CPC ....................... F05D 2260/32; F05B 2260/302
See application file for complete search history.

(56) References Cited

U.S. PATENT DOCUMENTS 4,767,262 A * 8/1988 Simon ................ H05K 7/20581 415/60
6,190,197 B1 * 2/2001 Polgar ................ H01R 13/6315 439/954
6,592,449 B2 * 7/2003 Cipolla ................. F04D 27/004 361/679.48
8,123,467 B2 * 2/2012 Lin ..................... F04D 25/0613 415/121.3
8,223,493 B2 * 7/2012 Ye ............................. G06F 1/20 361/679.48
9,634,415 B2 * 4/2017 Ye ........................ H01R 43/205
10,690,336 B1 * 6/2020 Chen .......................... G06F 1/20
2008/0187393 A1 * 8/2008 Nellessen ................ A63H 3/50 403/345
2017/0331346 A1 11/2017 Lai

FOREIGN PATENT DOCUMENTS

CN 101725571 B 7/2012
KR 20190051738 A * 5/2019
TW M396884 U 1/2011
TW 201245932 A * 11/2012 ........... G06F 1/1658

* cited by examiner

*Primary Examiner* — Courtney D Heinle
*Assistant Examiner* — Danielle M. Christensen
(74) *Attorney, Agent, or Firm* — MUNCY, GEISSLER, OLDS & LOWE, P.C.

(57) ABSTRACT

A magnetically attracted fan set comprises N+1 fans, the N≥1, and each of the N+1 fans has a fan frame and an airflow generating component disposed on the fan frame. Any two adjacent fans of the N+1 fans respectively have a joint surface, each of the joint surfaces has at least one fixing member capable of forming magnetic attraction, when the joint surface is close to the other joint surface at a distance sufficient for the two fixing members on the two joint surfaces to form magnetic attraction, two of the N+1 fans are joined together. Accordingly, the invention is capable of directly and quickly joining the N+1 fans without requiring complicated assembly gestures or other external components.

15 Claims, 17 Drawing Sheets

MAGNETICALLY ATTRACTED FAN SET

FIELD OF THE INVENTION

The invention relates to a fan set, and more particularly to a fan set capable of joining together through magnetic attraction.

BACKGROUND OF THE INVENTION

According to investigation, currently, fan manufacturers have designed the fan frame in a way that can meet the user's demand for joining multiple fans in a horizontal manner. For example, TW M396884 and US 2017/0331346 disclose the technical means of joining fans through additional fixing members. Specifically, the fan frame is provided with a coupling groove or a coupling member, and the coupling groove and the coupling member are respectively provided with perforations in which the fixing member is disposed. When joining the fans, the user inserts the coupling member on one of the fans into the coupling groove on the other fan, so that the perforation on the coupling member and the perforation on the coupling groove are aligned, and then the fixing member is penetrated into the perforations, so that the fixing member restricts the coupling member and the coupling groove. However, the aforementioned means for joining multiple fans rely heavily on the limiting function provided by the fixing member, if the user is unable to use the fixing member when joining the fans, the fans cannot be fixed, and displacement is likely to occur. In addition, the conventional fixing member is an independent component, and in general, the size of the fixing member is significantly smaller than the fans, and therefore the fixing member can be lost easily during storage, causing inconvenience to the user.

In order to improve the aforementioned problems, fan manufacturers have changed to join the fans without using additional fixing members, as disclosed in patents such as U.S. Pat. No. 10,690,336B and CN 101725571B. Taking U.S. Pat. No. 10,690,336B as an example, the fans are provided with slots or positioning blocks on the fan frame. When joining the fans, the user connects and assembles one of the fan's positioning block to the other fan's slot to form an assembling relationship between the fans. However, the conventional technical solution of directly forming mechanical connection structures on the fans is likely to cause the mechanical connection structures to be misaligned due to excessive dimensional tolerances between the fans. Furthermore, the conventional fan has certain gestures in assembling or disassembling, which makes assembly and disassembly of the conventional fans complicated and inconvenient for users.

SUMMARY OF THE INVENTION

A main object of the invention is to solve the problem of inconvenience in assembling conventional fans.

In order to achieve the above object, the invention provides a magnetically attracted fan set comprising N+1 fans, the N≥1, and each of the N+1 fans has a fan frame and an airflow generating component disposed on the fan frame. Any two adjacent fans of the N+1 fans respectively have a joint surface, each of the joint surfaces has at least one fixing member capable of forming magnetic attraction, when the joint surface is close to the other joint surface at a distance sufficient for the two fixing members on the two joint surfaces to form magnetic attraction, two of the N+1 fans are joined together.

In one embodiment, the two fixing members forming magnetic attraction are a magnet respectively.

In one embodiment, the two fixing members forming magnetic attraction are a magnet and a metal member respectively.

In one embodiment, the two fixing members are on the joint surface, and the two fixing members are located on two opposite sides of the joint surface.

In one embodiment, the fan frame comprises a top plate having a first air opening, a bottom plate parallel to the top plate and having a second air opening communicating with the first air opening, and a side wall connecting the top plate and the bottom plate, and the joint surface is a surface of the side wall.

In one embodiment, the fan frame comprises two half-shells assembled with each other, each of the half-shells is formed with two accommodating grooves on one side used to form the side wall, and the two accommodating grooves are provided for disposing the two fixing members respectively.

In one embodiment, each of the fans has at least one convex portion or concave portion located on the joint surface and provided for disposing the fixing member, and each of the N+1 fans capable of joining with the aforementioned fan has at least one other convex portion or concave portion located on its joint surface and capable of connecting with the aforementioned convex portion or concave portion.

In one embodiment, a transmission electrode is provided on the joint surface.

In one embodiment, the transmission electrode of one of the N+1 fans is a transmission pin set, and the transmission electrode of one of the N+1 fans capable of joining with the aforementioned fan is a transmission socket.

In one embodiment, the transmission electrode is disposed adjacent to the fixing member.

In one embodiment, the fan frame comprises two half-shells assembled with each other, each of the half-shells is formed with a mounting groove on one side used to form the side wall, the mounting groove is provided for placing the transmission electrode, and each of the half-shells is formed with a notch corresponding to the mounting groove, and the two notches jointly form an opening in which the transmission electrode is exposed after the two half-shells are assembled.

In one embodiment, the magnetically attracted fan set is connected to a control source, the control source has a control source electrode, and the transmission electrode of one of the N+1 fans at one end is connected to the control source electrode.

Through the foregoing implementation of the invention, compared with the prior art, the invention has the following features: the invention makes any two adjacent fans of the N+1 fans to have the joint surface respectively, and each of the joint surfaces has at least one fixing member capable of forming magnetic attraction, when the two joint surfaces are close to each other, the two fixing members are capable of generating magnetic attraction, so that two of the N+1 fans can be joined together without requiring complicated assembly gestures or other external components.

DETAILED DESCRIPTION OF THE PREFERRED EMBODIMENTS

The detailed description and technical contents of the invention are described below with reference to the drawings.

Figure 1:
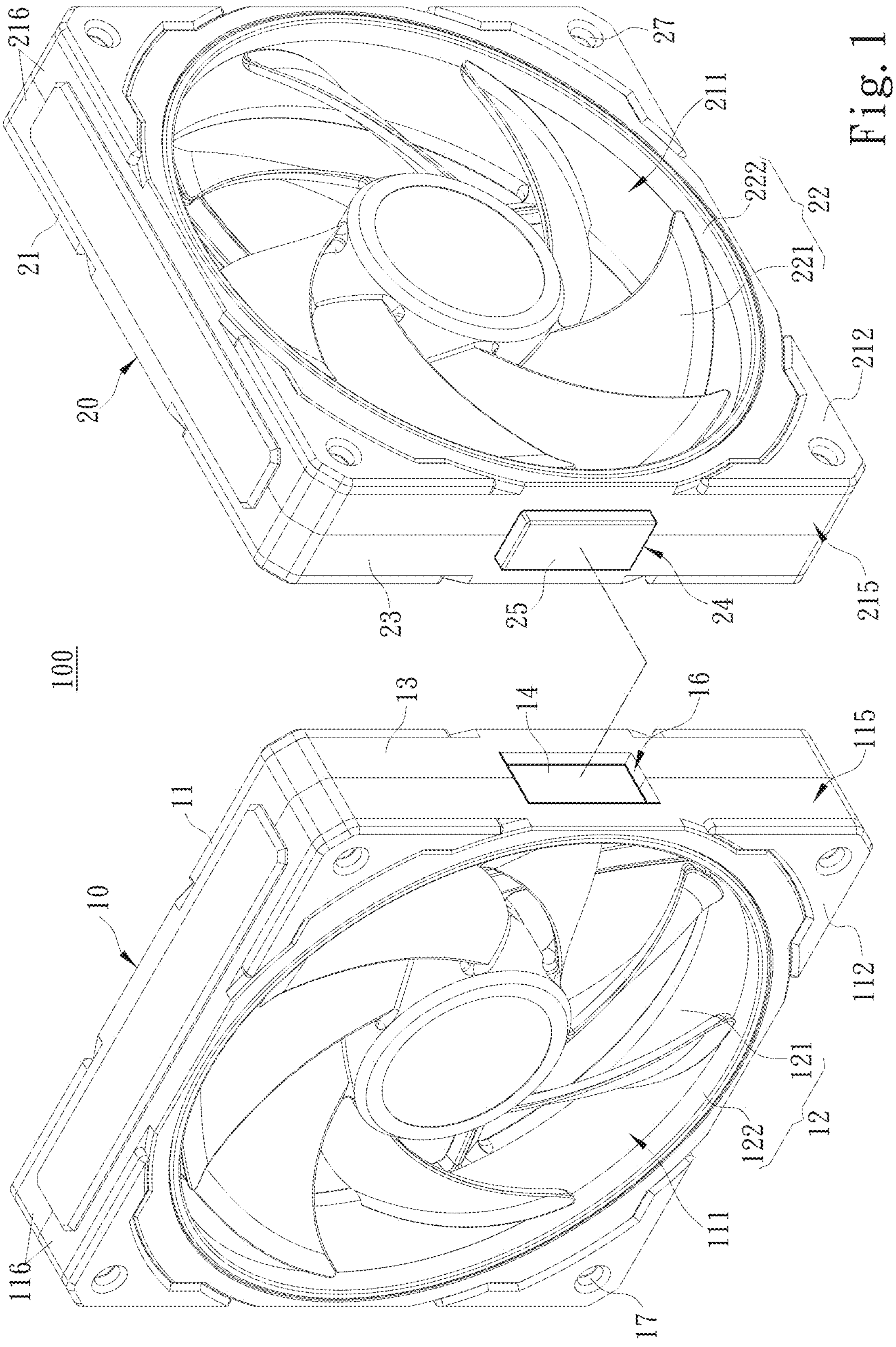
FIG. 1 is a perspective view of a fan set according to a first embodiment of the invention.

Please refer to FIG. 1. The invention provides a magnetically attracted fan set 100. The fan set 100 comprises N+1 fans, the N≥1. In addition, in order to facilitate the description of the fan set 100 hereinafter, the fan set 100 is temporarily described with the N=1, that is, the fan set 100 comprises two fans 10, 20.

Each of the fans (10 or 20) has a fan frame (11 or 21) and an airflow generating component (12 or 22) disposed on the fan frame (11 or 21). In one embodiment, the airflow generating component (12 or 22) comprises a driving component (not shown in the figure) disposed inside the fan frame (11 or 21), a fan blade set (121 or 221) disposed inside the fan frame (11 or 21) and connected to the driving component, and a ring (122 or 222) surrounding outside the fan blade set (121 or 221) and defining an airflow channel, the fan blade set (121 or 221) is driven by the driving component to generate an airflow, and the airflow is guided by the ring (122 or 222) during flowing process and flows toward outside of the fan (10 or 20) to which the ring (122 or 222) belongs.

Figure 6:
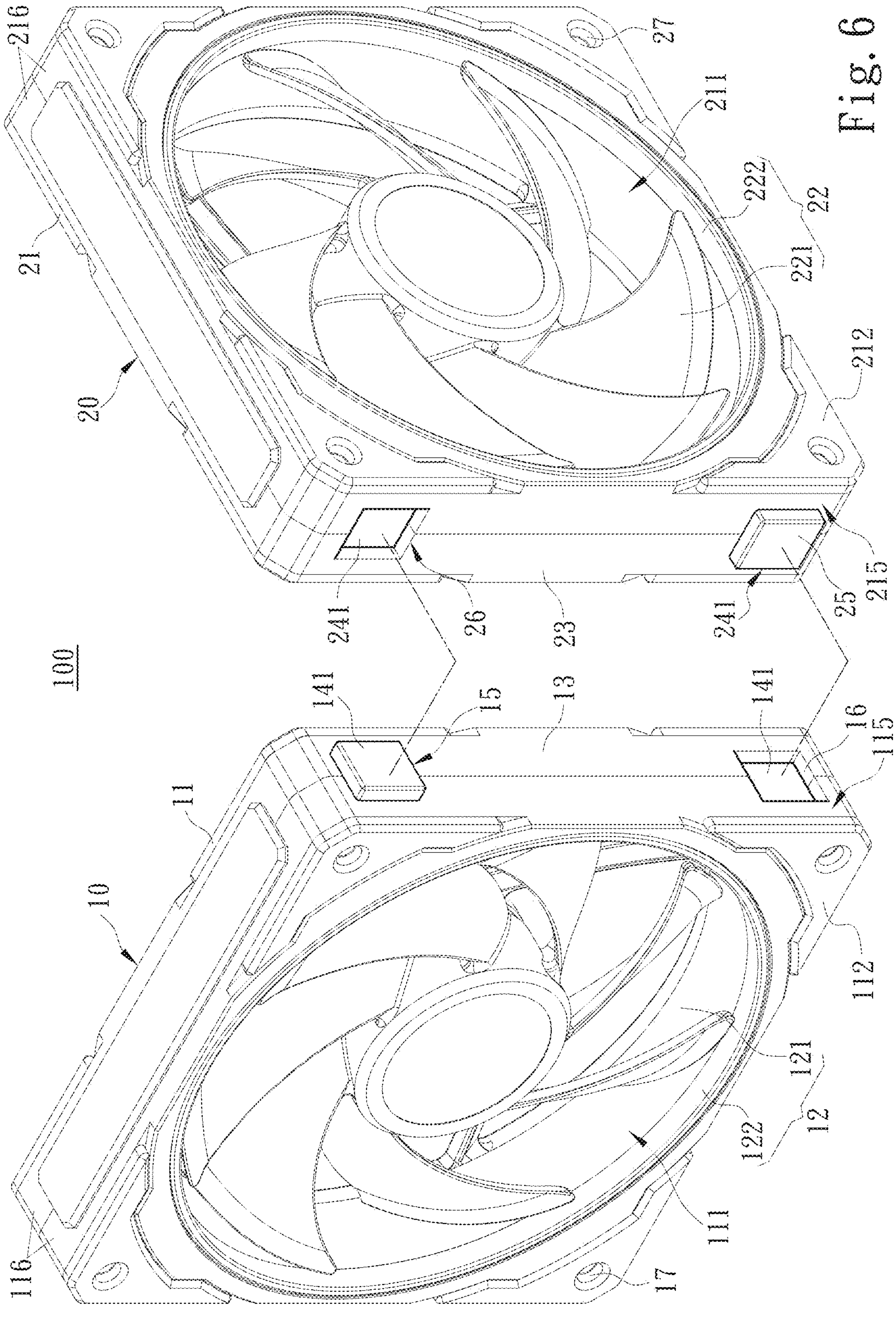
FIG. 6 is a perspective view of the fan set according to a third embodiment of the invention.
Figure 7:
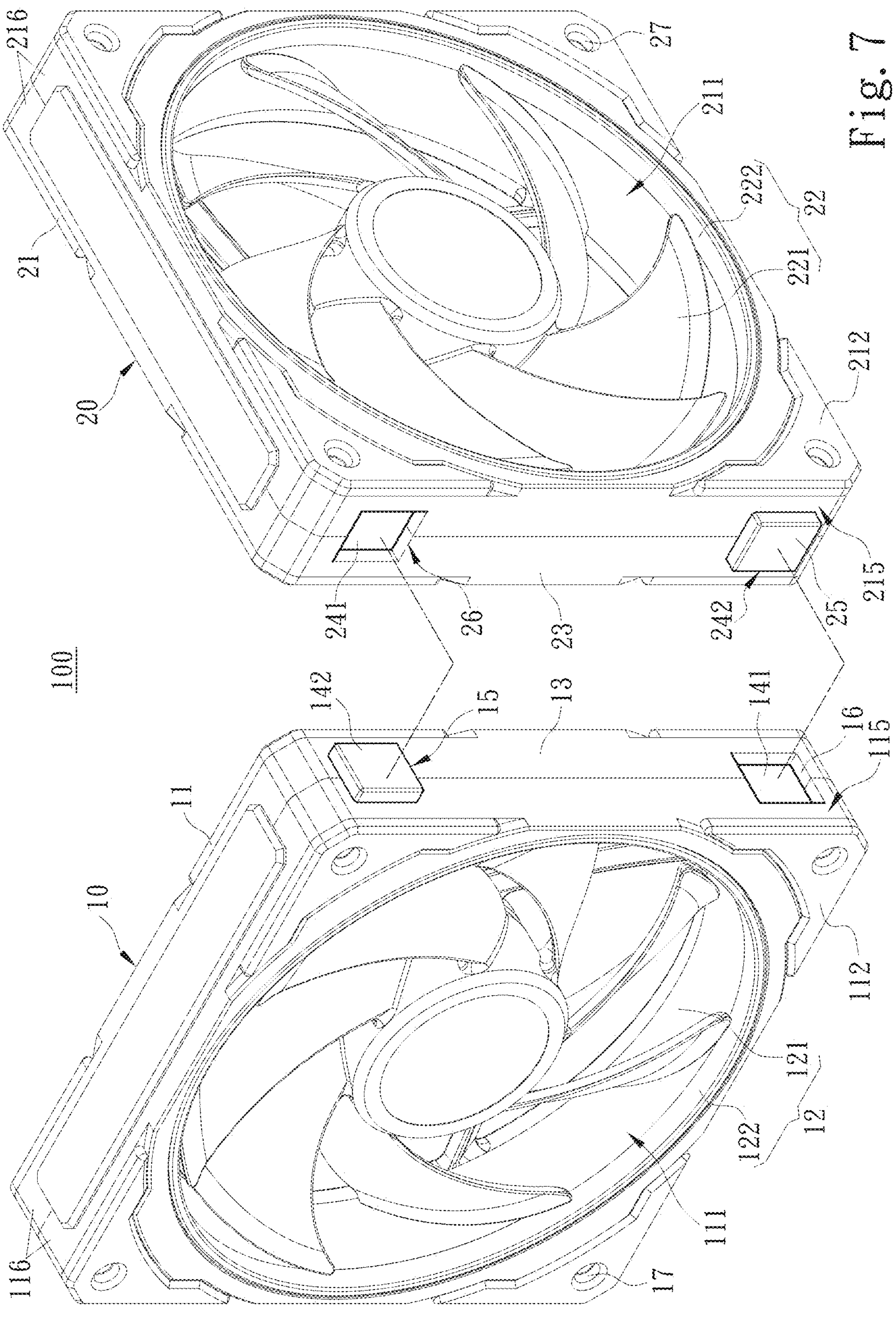
FIG. 7 is a perspective view of the fan set according to a fourth embodiment of the invention.

Further, referring to FIG. 1 to FIG. 5, the two fans 10, 20 are disposed adjacent to each other, and the two fans 10, 20 respectively have a joint surface (13 or 23) on adjacent sides. More specifically, each of the fan frames (11 or 21) comprises a top plate (112 or 212) having a first air opening (111 or 211), a bottom plate (114 or 214) parallel to the top plate (112 or 212) and having a second air opening (113 or 213) communicating with the first air opening (111 or 211), and a side wall (115 or 215) connecting the top plate (112 or 212) and the bottom plate (114 or 214). In this embodiment, the joint surface (13 or 23) is a surface of the side wall (115 or 215) of the fan (10 or 20) to which the joint surface (13 or 23) belongs. Practically, the joint surface (13 or 23) can also be the top plate (112 or 212) or the bottom plate (114 or 214) located on the fan (10 or 20) to which the joint surface (13 or 23) belongs, so that the two fans 10, 20 are assembled in a stacking manner. Each of the joint surfaces (13 or 23) is provided with at least one fixing member (14 or 24) capable of forming magnetic attraction. For example, the two fixing members 14, 24 of the two fans 10, 20 can each be a magnet (141 or 241), as shown in FIG. 6. In another example, the fixing member (14 or 24) of one of the fans (10 or 20) can be the magnet (141 or 241), and the fixing member (24 or 14) of the other fan (20 or 10) can be a metal member (242 or 142) attracted by the magnet (141 or 241), as shown in FIG. 7. Accordingly, when the two joint surfaces 13, 23 of the two fans 10, 20 are close to each other at a distance sufficient for the two fixing members 14, 24 to form magnetic attraction, the two fans 10, 20 are joined together.

It can be known from the above that the fan set 100 of the invention is provided with the fixing members (14 or 24) on the two fans 10, 20 respectively, so that a user does not need to rely on external components for assembly, and at the same time, if the user loses the external components, a situation of not being able to assemble the conventional fans can be prevented. Furthermore, the two fans 10, 20 of the invention do not need to use specific assembly gestures in assembling, but through magnetic attraction generated by the two fixing members 14, 24 when being close to each other, the two fans 10, 20 can be easily joined together.

Figure 2:
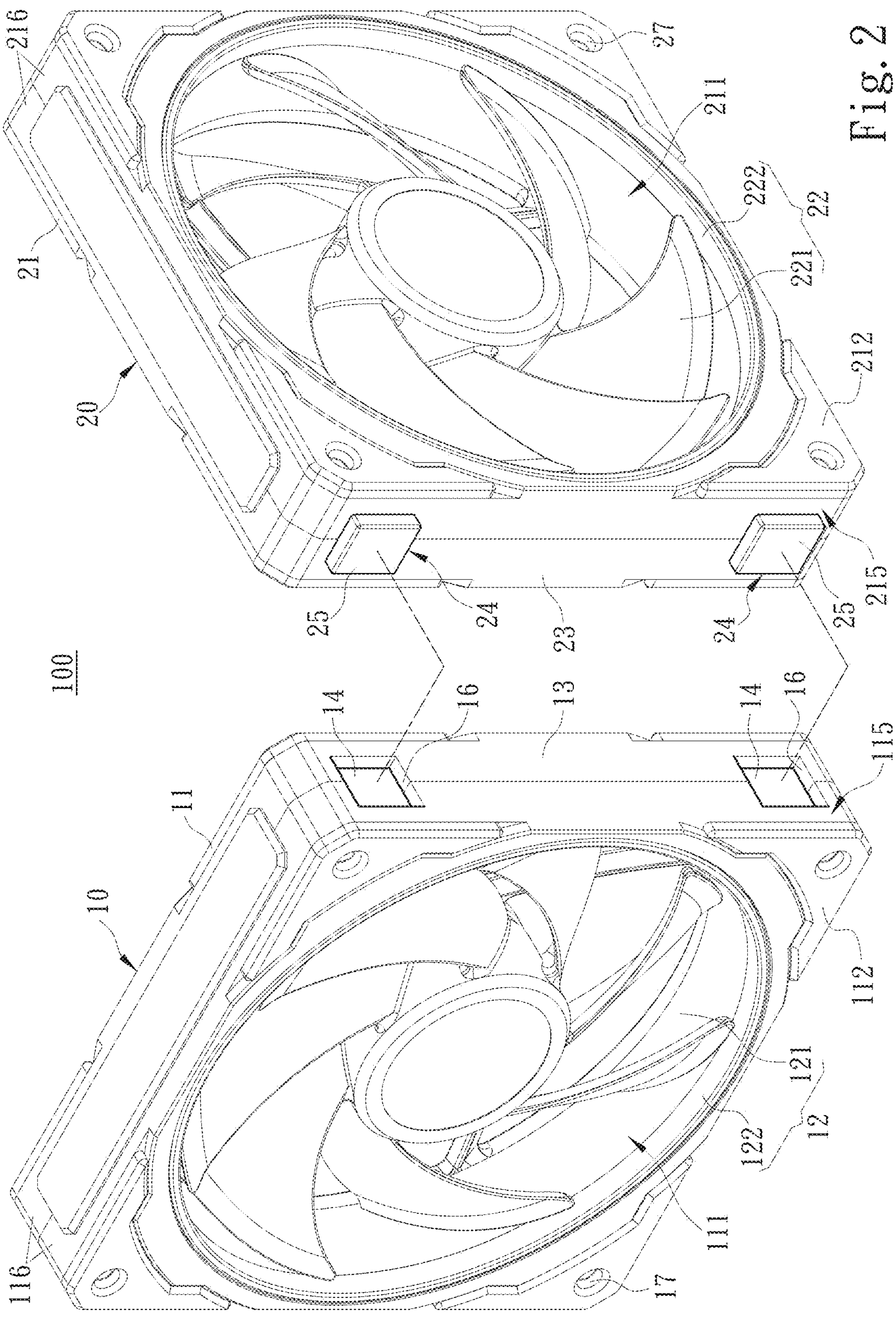
FIG. 2 is a perspective view of the fan set according to a second embodiment of the invention.
Figure 3:
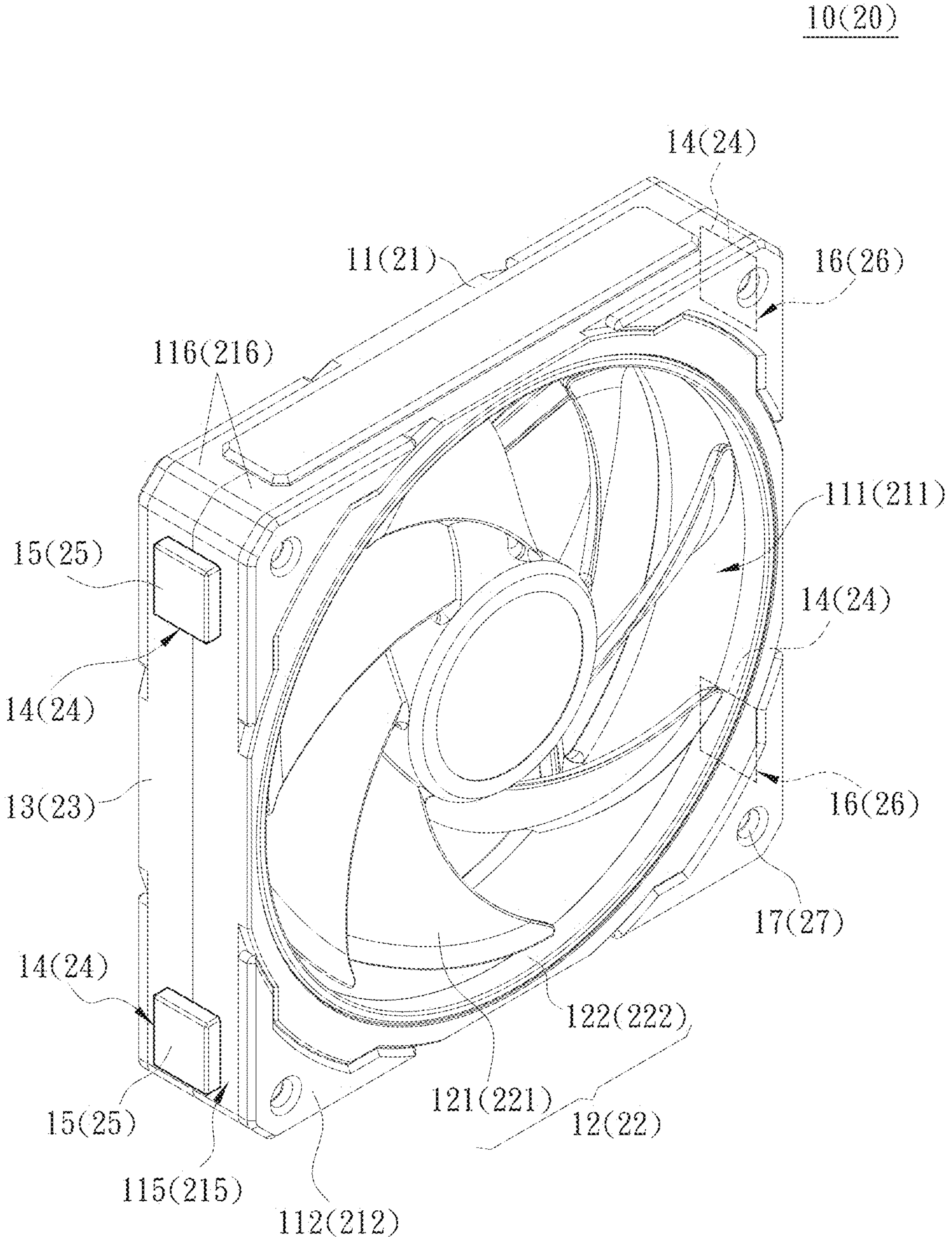
FIG. 3 is a perspective structural view of a single fan according to the second embodiment of the invention.
Figure 4:
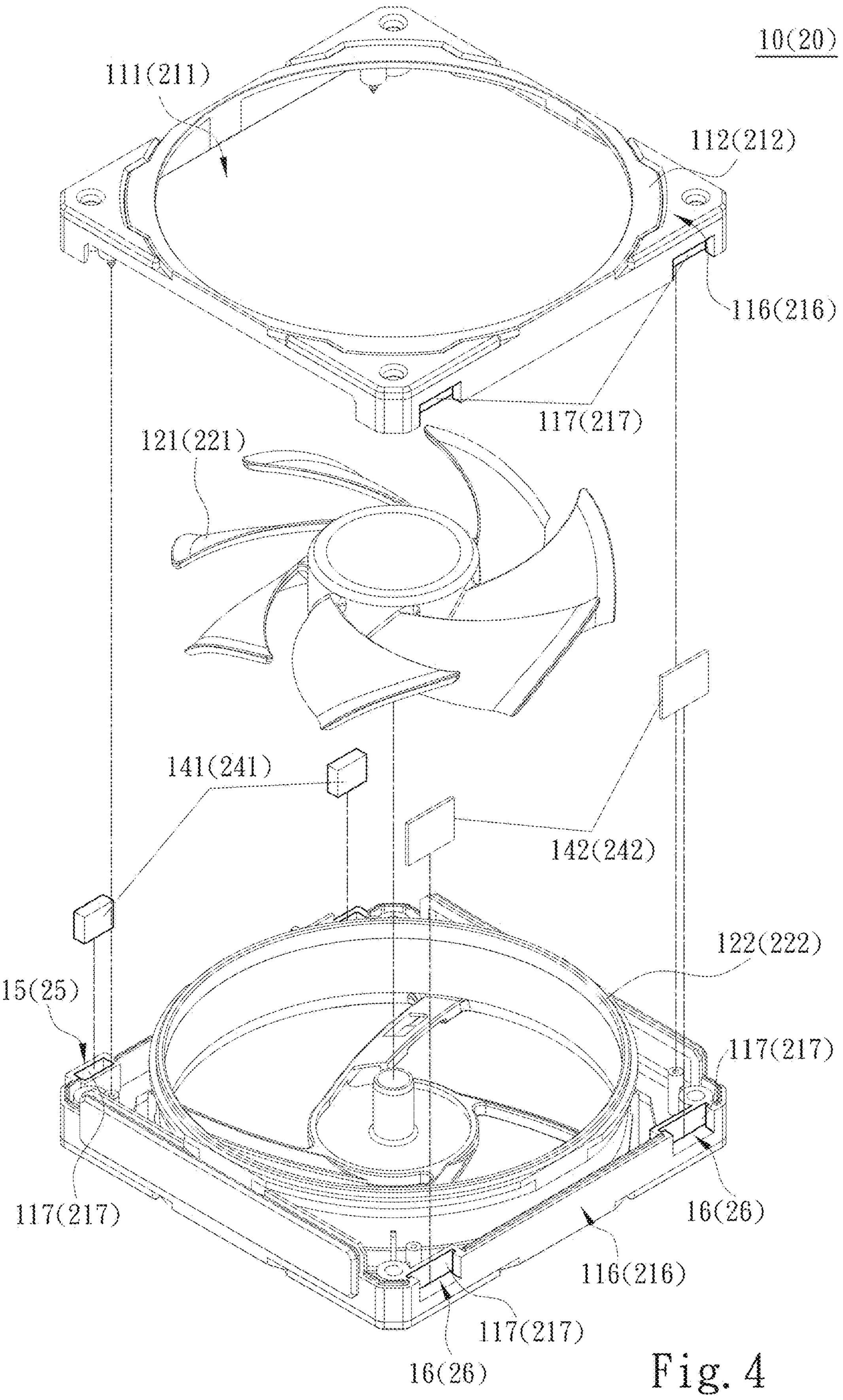
FIG. 4 is an exploded perspective view of a fan structure according to the second embodiment of the invention.
Figure 5:
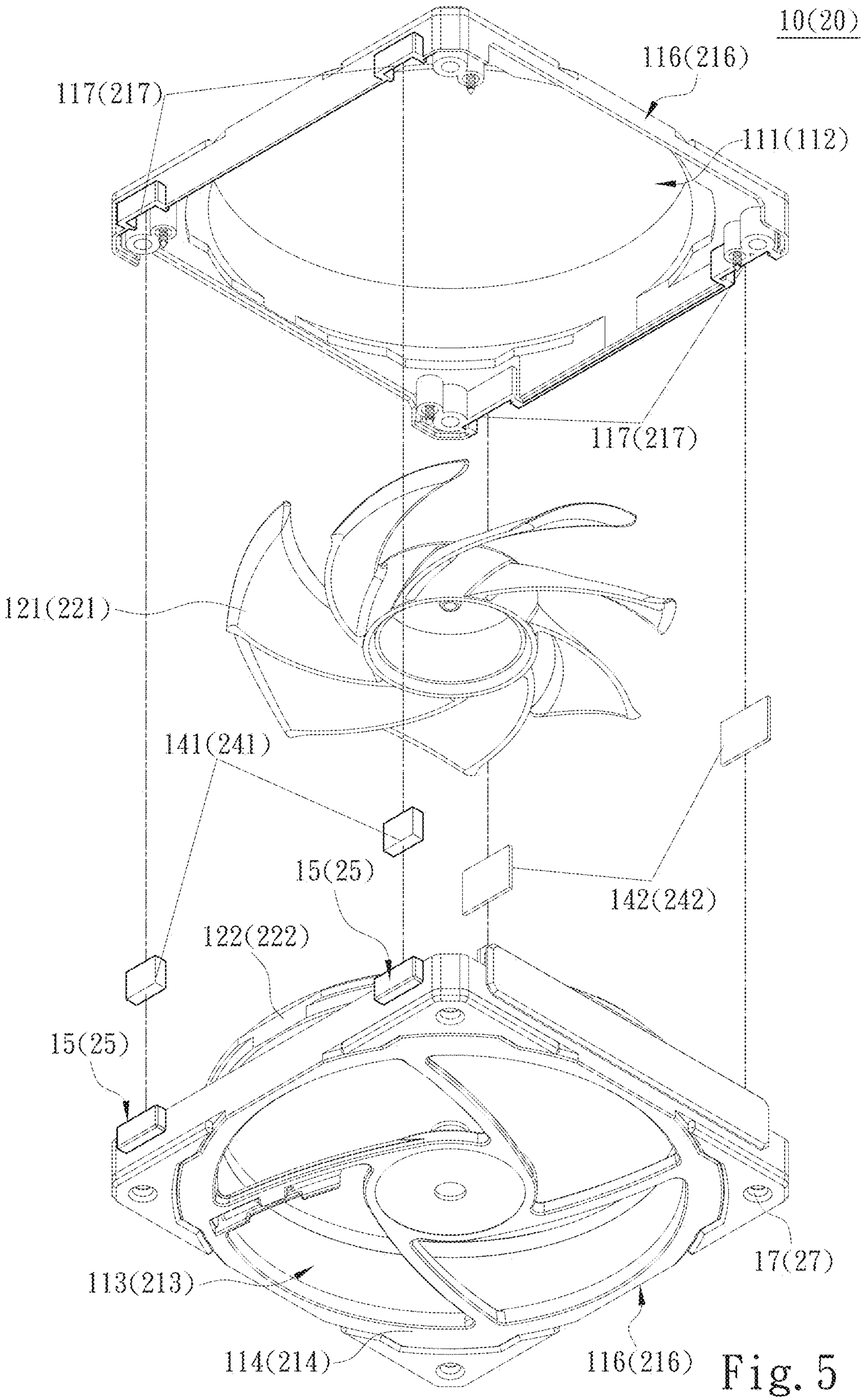
FIG. 5 is an exploded perspective view of the fan structure viewed from another angle according to the second embodiment of the invention.

Please refer to FIG. 1 to FIG. 4 again. In one embodiment of the invention, in order to assist joining of the two fans 10, 20, one of the fans (10 or 20) has at least one convex portion (15 or 25) or one concave portion (16 or 26), the convex portion (15 or 25) or the concave portion (16 or 26) is located on the joint surface (13 or 23) of the fan (10 or 20) to which the convex portion (15 or 25) or the concave portion (16 or 26) belongs, and the fixing member (14 or 24) is disposed in the convex portion (15 or 25) or the concave portion (16 or 26). The other fan (20 or 10) also has the convex portion (25 or 15) or the concave portion (26 or 16) for connecting with the convex portion (15 or 25) or the concave portion (16 or 26) of the aforementioned fan (10 or 20). In other words, if one of the fans (10 or 20) is provided with the convex portion (15 or 25), the other fan (20 or 10) must be provided with the concave portion (26 or 16). When the two fans 10, 20 are assembled, the convex portion (15 or 25) of one of the fans (10 or 20) is connected with the concave portion (26 or 16) of the other fan (20 or 10).

Further, in the invention, in order to improve a joining stability between the two fans 10, 20, each of the joint surfaces (13 or 23) has the two fixing members (14 or 24), and the two fixing members (14 or 24)) are located on opposite sides of the joint surface (13 or 23). In one embodiment, the two fixing members (14 or 24) on the same joint surface (13 or 23) can both be the magnet (141 or 241). In another embodiment, the two fixing members (14 or 24) on one of the joint surfaces (13 or 23) can be the magnet (141 or 241) and the metal member (142 or 242) respectively, and the two fixing members (24 or 14) of the other joint surface (23 or 13) must be the magnet (241 or 141) and the metal member (242 or 142) respectively, and the magnet (241 or 141) of one of the joint surfaces (13 or 23) must be matched with the metal member (242 or 142) on the other joint surface (23 or 13). In this embodiment, each of the fans (10 or 20) can be provided with the convex portion (15 or 25) or the concave portion (16 or 26) to assist the two fans 10, 20 in joining On the other hand, please refer to FIG. 1 to FIG. 4 again, each of the fan frames (11 or 21) comprises two half-shells (116 or 216) assembled to each other, and the two half-shells (116 or 216) together form the convex portion (15 or 25) or the concave portion (16 or 26) after assembling. Each of the half-shells (116 or 216) is formed with two accommodating grooves (117 or 217) on one side used to form the side wall (115 or 215), and the two accommodating grooves (117 or 217) are located in the convex portion (15 or 25) or in the concave portion (16 or 26), and are provided for disposing the two fixing members (14 or 24) respectively.

Figure 8:
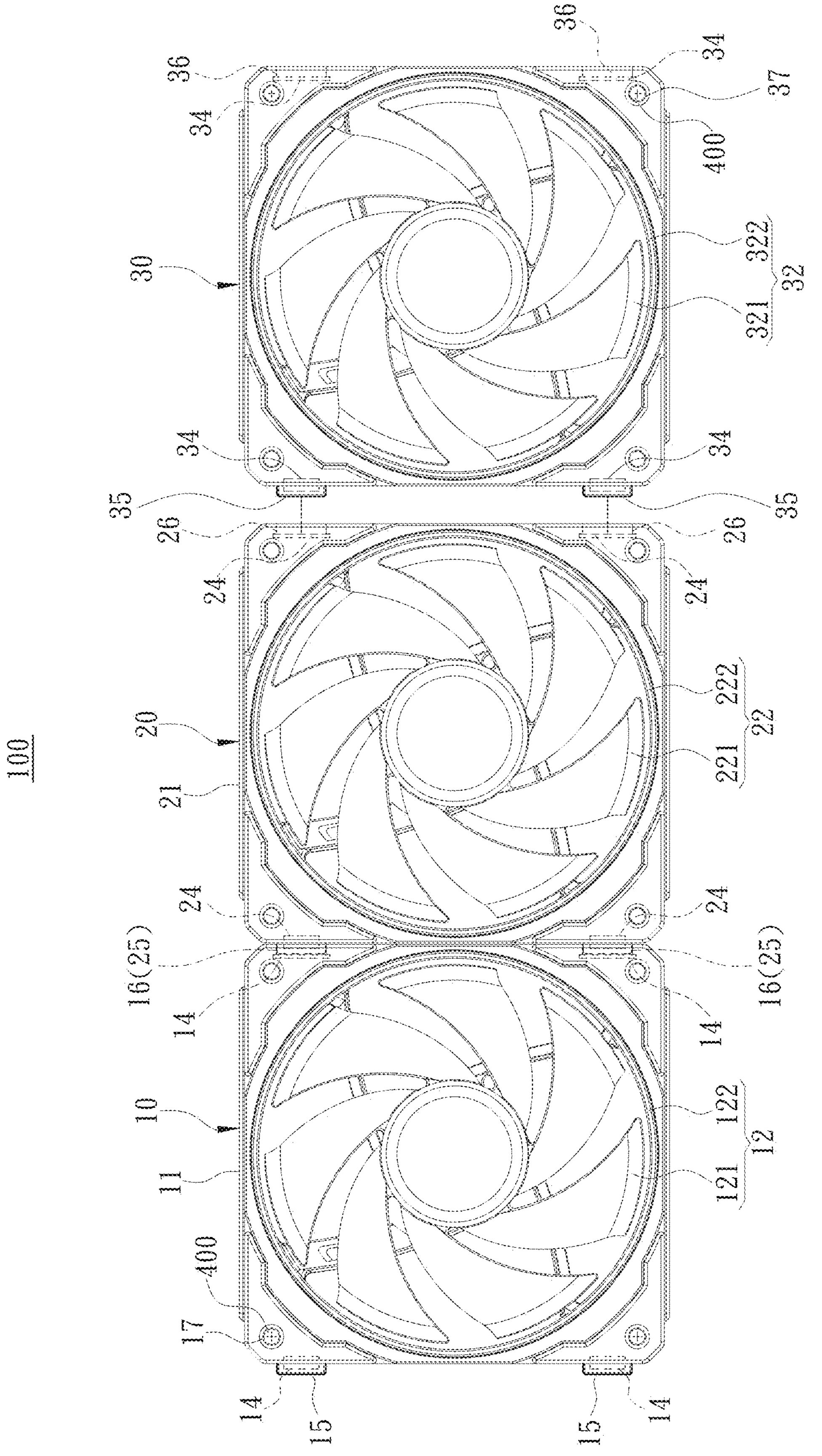
FIG. 8 is a schematic diagram of the fan set according to a fifth embodiment of the invention.

In addition, please refer to FIG. 7 and FIG. 8. In one embodiment, each of the fans (10 or 20) can be provided with the joint surface (13 or 23) on two adjacent sides of the side wall (115 or 215) respectively, when the fan set 100 comprises more than three fans (10, 20, 30), the fans (10, 20, 30) can be arranged in a rectangular array or in an L-shaped manner. In another embodiment, each of the fans (10 or 20) can be provided with the joint surface (13 or 23) on two opposite sides of the side wall (115 or 215) respectively, so that the fans (10, 20, 30) of the fan set 100 are arranged in a linear manner. Further, the fans 10, 20, 30 respectively have at least one set of assembling holes (17 or 27 or 37) arranged at two linear ends, the set of assembling holes (17 or 27 or 37) are located at two ends of the fan set 100, the set of assembling holes (17 or 27 or 37) are used to assemble with a set of connectors 400, so that the fan set 100 can be fixed to an electronic device (such as a host computer, not shown in the figures).

Figure 9:
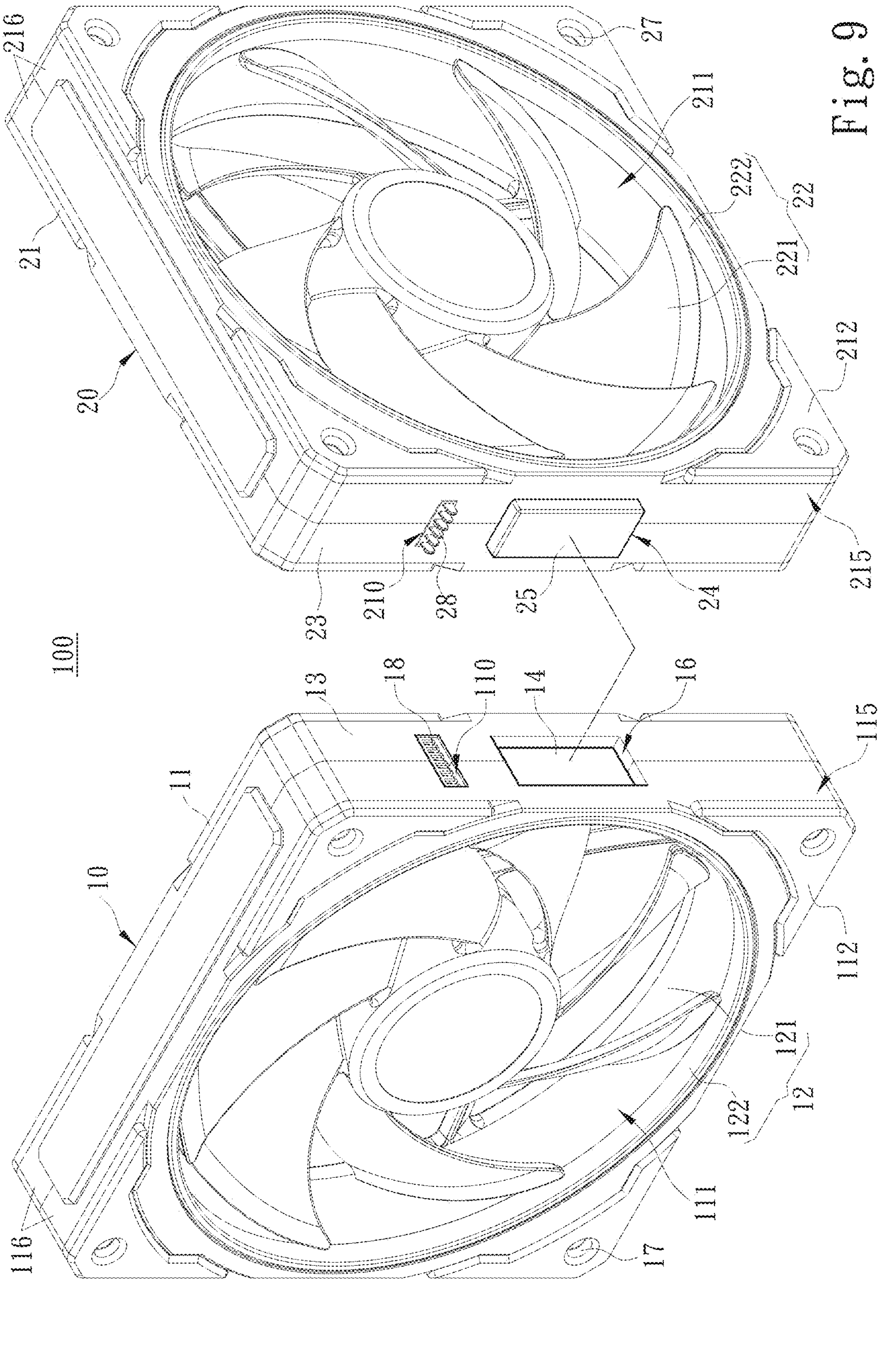
FIG. 9 is a perspective view of the fan set according to a sixth embodiment of the invention.
Figure 10:
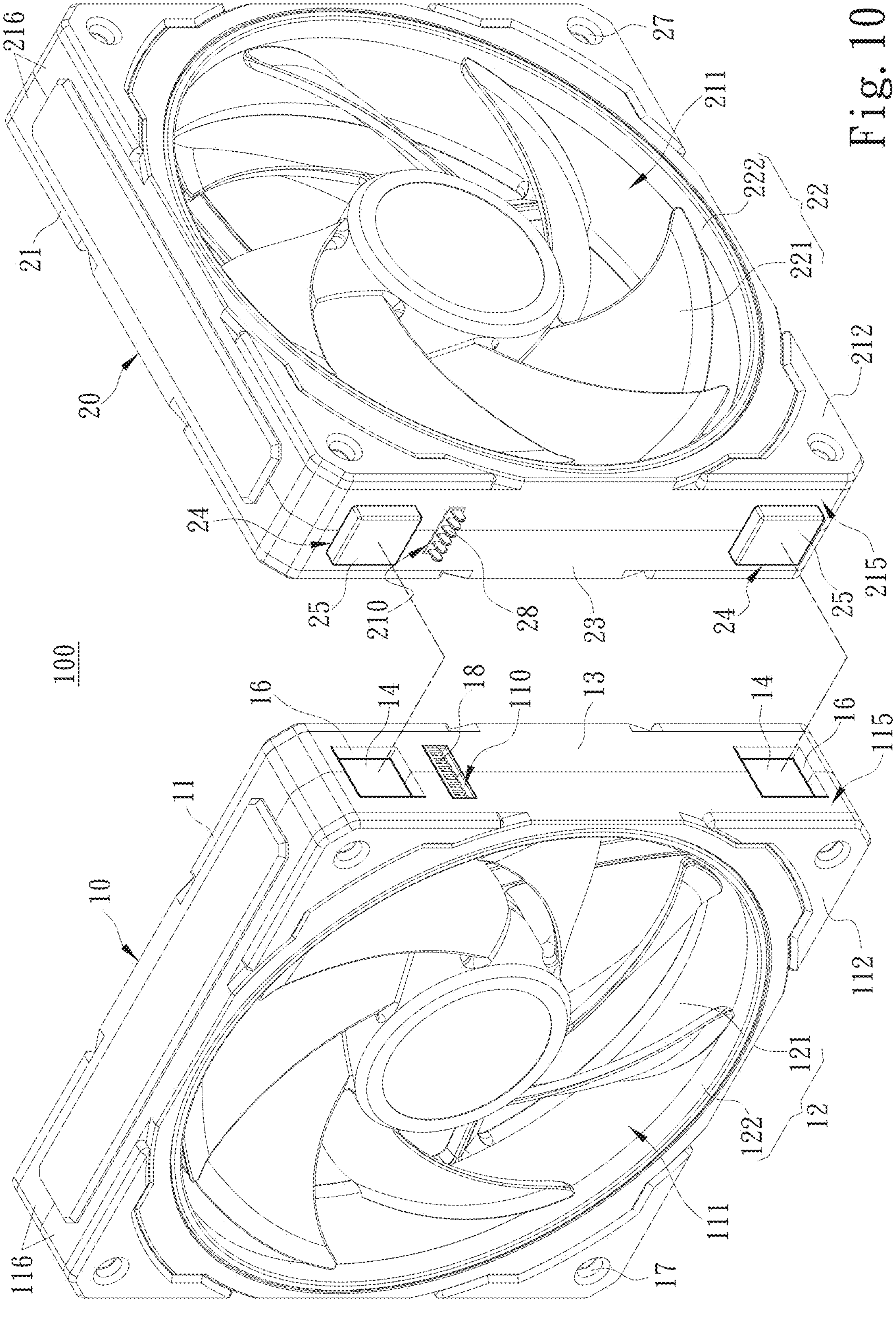
FIG. 10 is a perspective view of the fan set according to a seventh embodiment of the invention.
Figure 11:
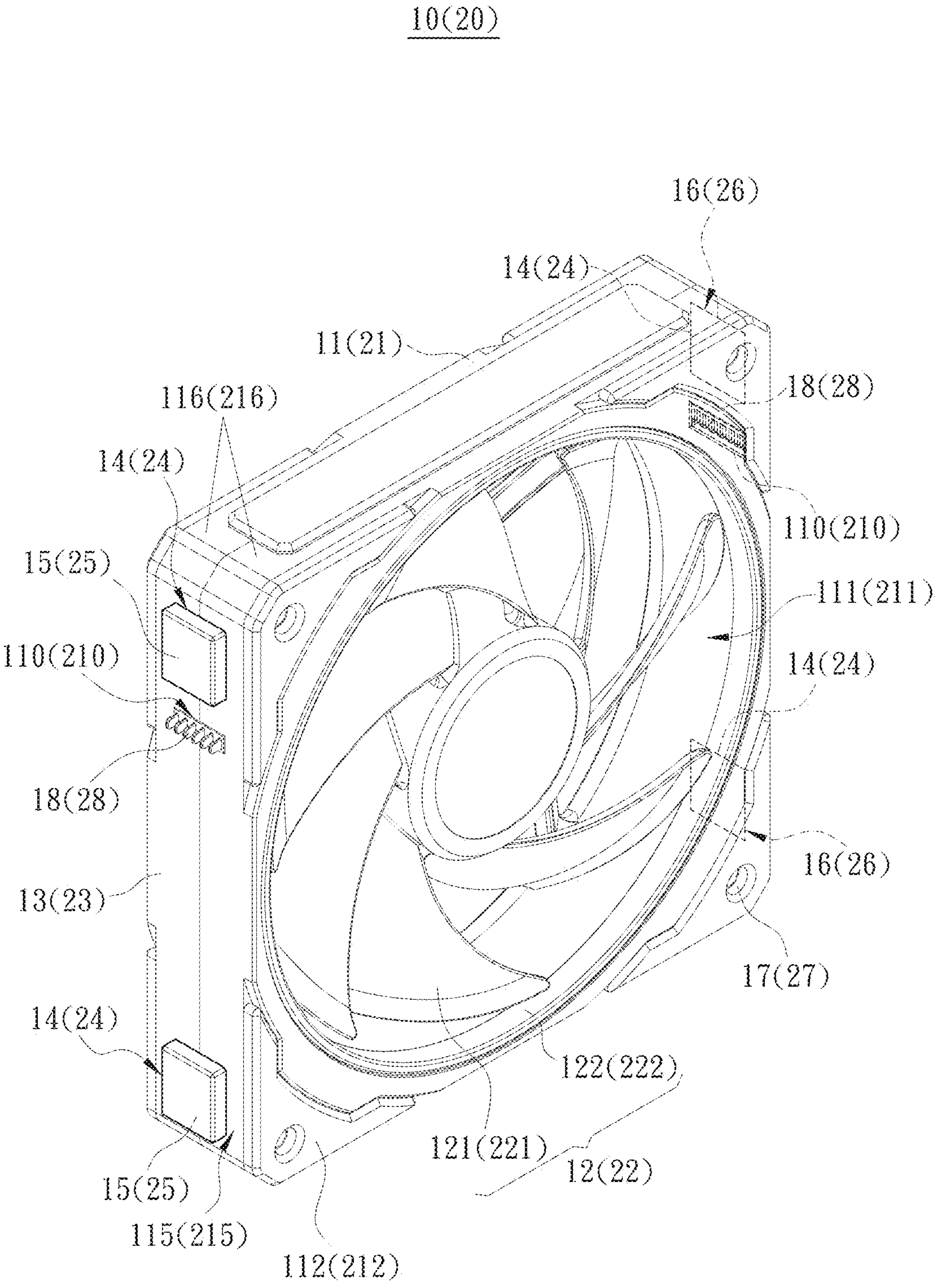
FIG. 11 is a perspective structural view of a single fan according to the seventh embodiment of the invention.
Figure 12:
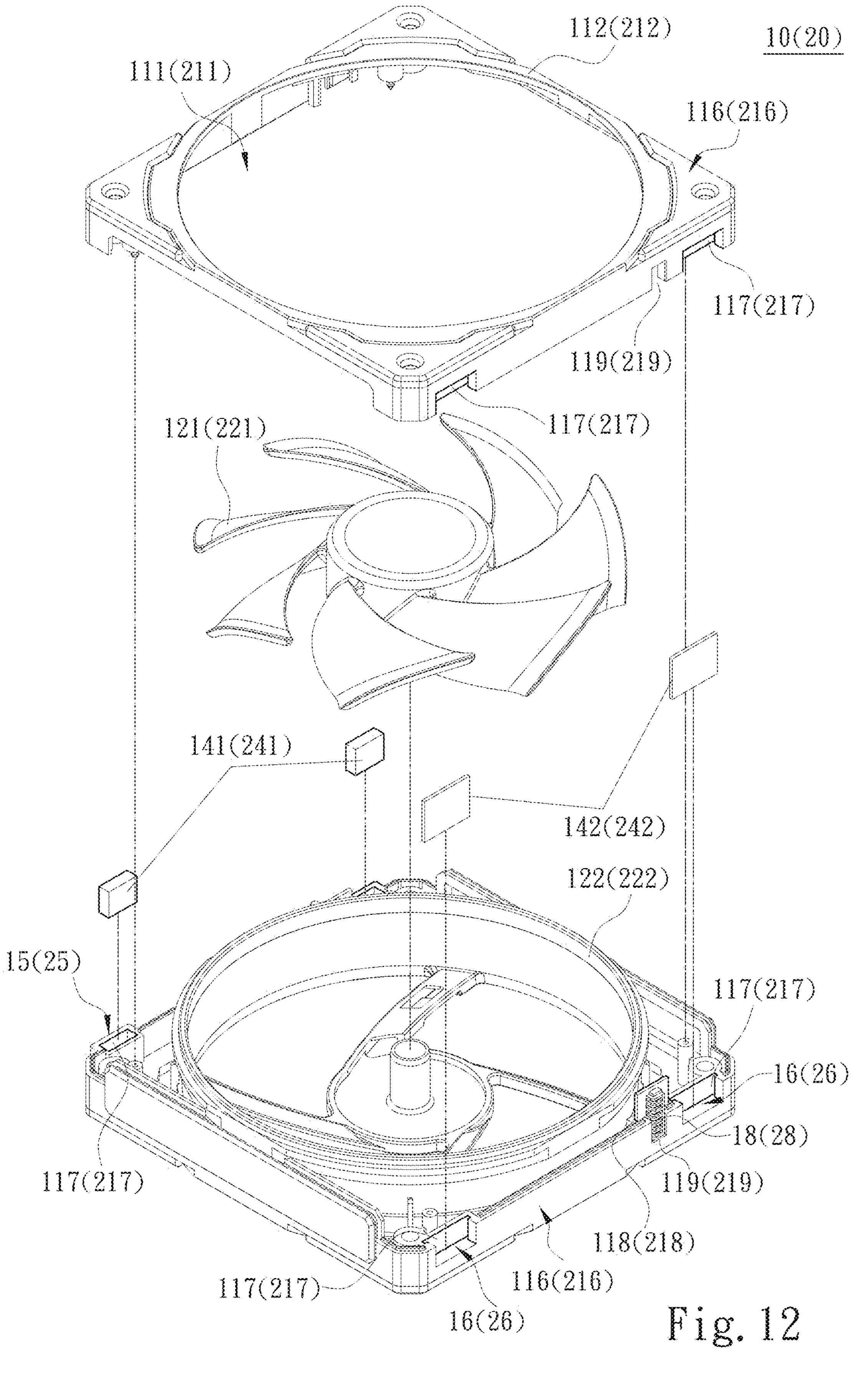
FIG. 12 is an exploded perspective view of a fan structure according to the seventh embodiment of the invention.
Figure 13:
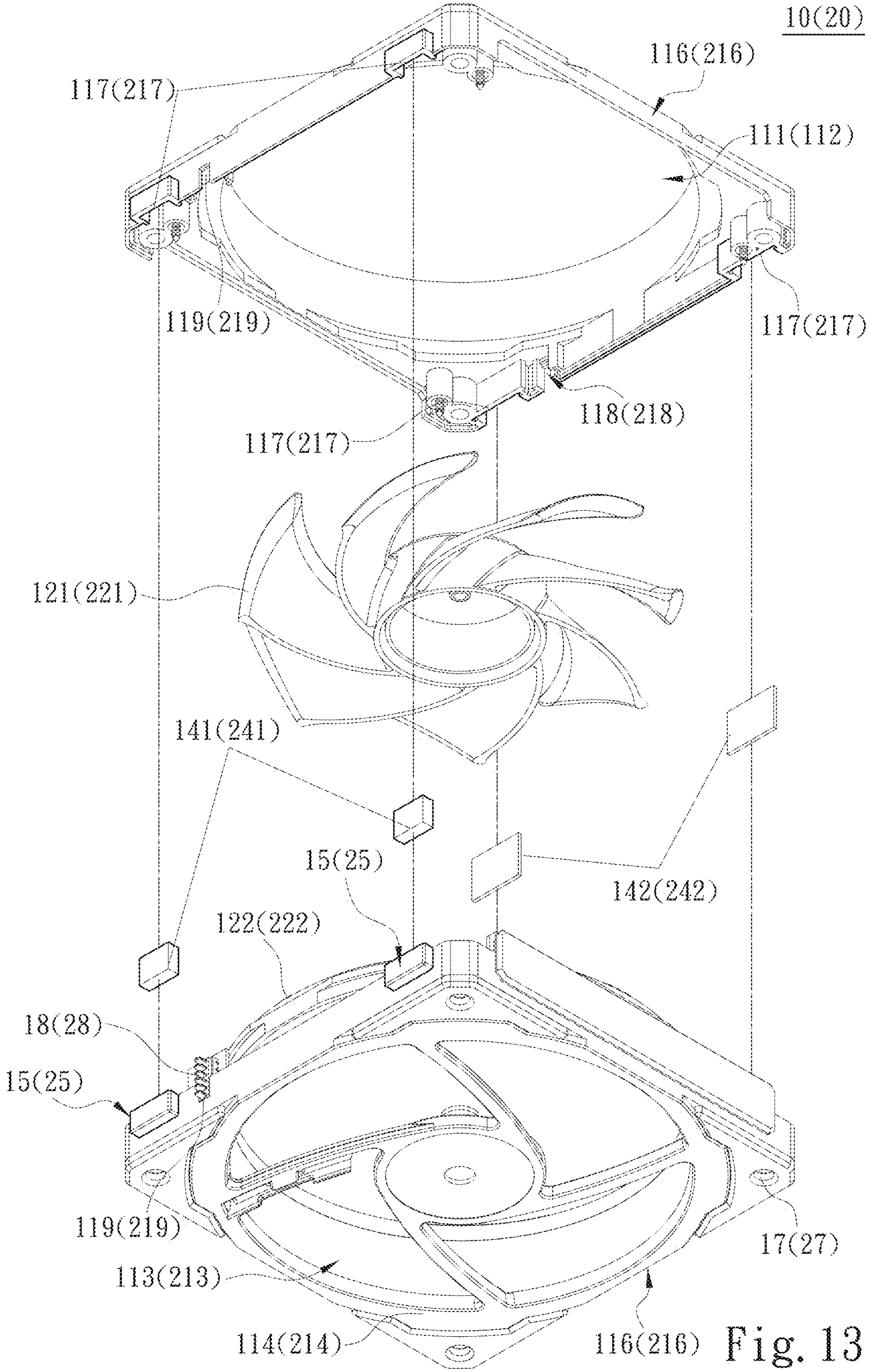
FIG. 13 is an exploded perspective view of the fan structure viewed from another angle according to the seventh embodiment of the invention.
Figure 14:
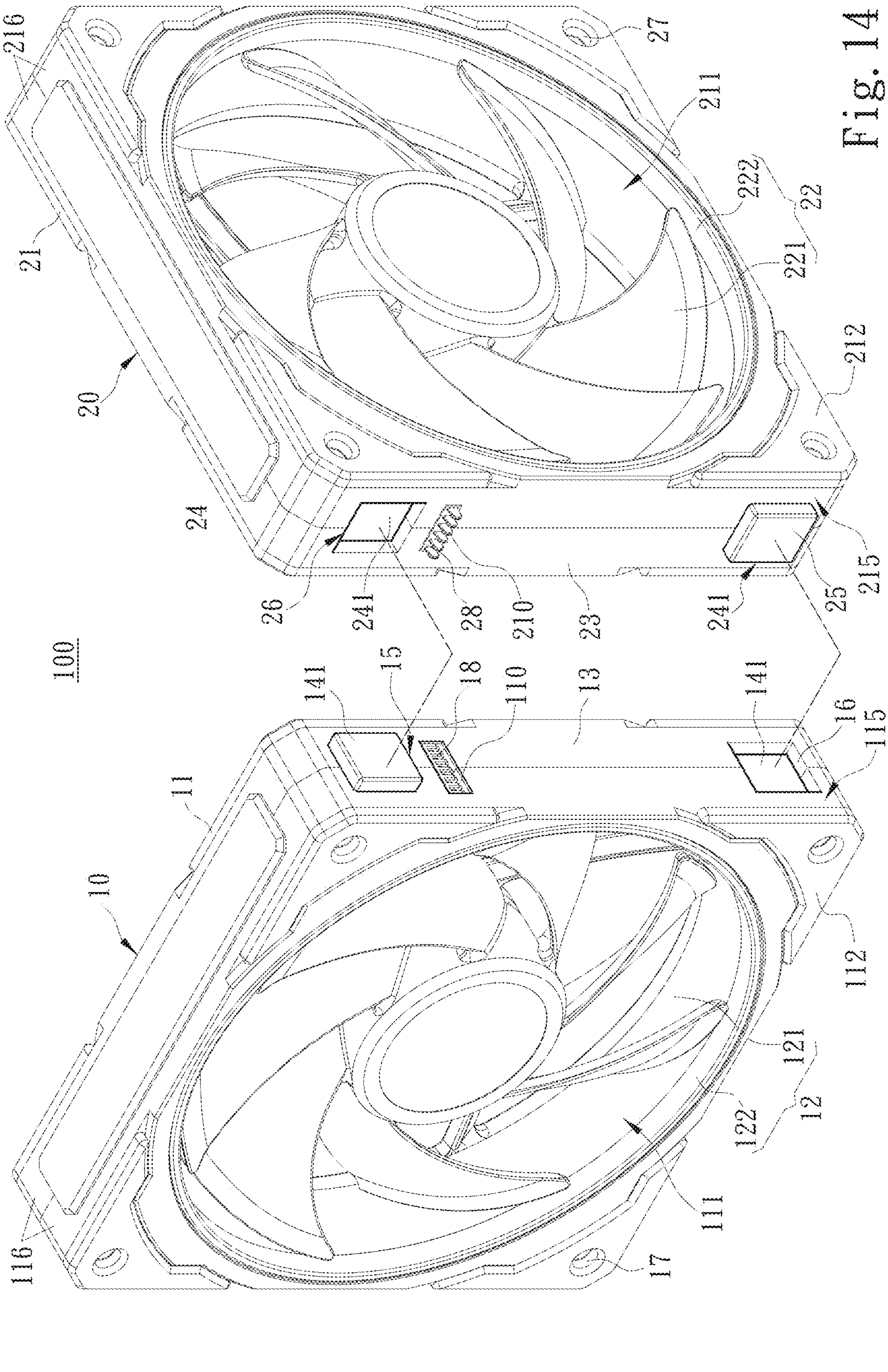
FIG. 14 is a perspective view of the fan set according to an eighth embodiment of the invention.
Figure 15:
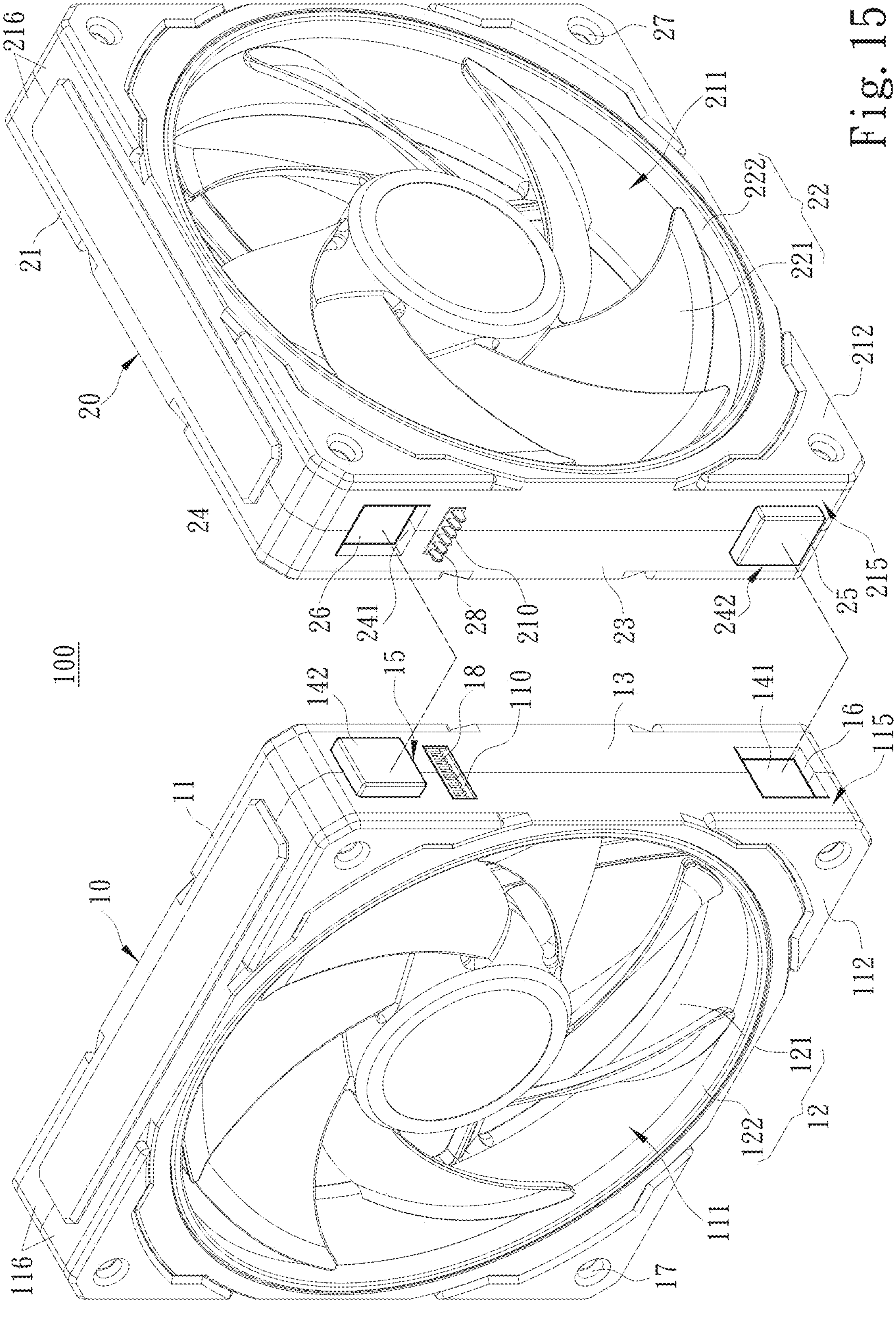
FIG. 15 is a perspective view of the fan set according to a ninth embodiment of the invention.

On the other hand, please refer to FIG. 9, in one embodiment, the two fans 10, 20 of the fan set 100 of the invention have electrical transmission capabilities. Specifically, each of the joint surfaces (13 or 23) is provided with a transmission electrode (18 or 28), and the transmission electrode (18 or 28) is disposed adjacent to the fixing member (14 or 24). In one embodiment, the transmission electrode (18 or 28) can also be disposed on one of four end corners of the fan (10 or 20) to which the transmission electrode (18 or 28) belongs according to requirements. In another embodiment, the transmission electrode (18 or 28) of one ofthe fans (10 or 20) can be a transmission pin set, and the transmission electrode (28 or 18) of the other fan (20 or 10) is a transmission socket matched with the transmission pin set of the aforementioned fan (10 or 20). When the two fixing members 14, 24 of the two fans 10, 20 are attracted to each other, the two transmission electrodes 18, 28 of the two fans 10, 20 can be assembled at the same time, so that the two fans 10, 20 directly form an electrical connection relationship.

Accordingly, the invention does not need to be implemented in a way of assembling the electric power and signal transmission pins of the fans after completing mechanical connection of the fans conventionally. In the invention, the two transmission electrodes 18, 28 can be electrically connected at the same time during magnetically attracted assembling of the two fans 10, 20. Furthermore, in the invention, no additional wires are required between the two fans 10, 20 to provide electric power and signal transmission, the two fans 10, 20 can directly transmit electric power and signals through the two transmission electrodes 18, 28 that are in contact with each other, thus unnecessary wires are omitted.

Please refer to FIG. 9 to FIG. 15, in order to expose the transmission electrode (18 or 28) on the fan frame (11 or 21) to which the transmission electrode (18 or 28) belongs, in this embodiment of the invention, each of the half-shells (116 or 216) is formed with a mounting groove (118 or 218) on one side used to form the side wall (115 or 215), the mounting groove (118 or 218) is provided for disposing the transmission electrode (18 or 28), and each of the half-shells (116 or 216) is formed with a notch (119 or 219) corresponding to the mounting groove (118 or 218). After the two half-shells (116 or 216) are assembled, the two mounting grooves 118, 218 jointly limit the transmission electrode (18 or 28), and at the same time the two notches (119 or 219) jointly form an opening (110 or 210) in which the transmission electrode (18 or 28) is exposed.

Further, in one embodiment, each of the fans (10 or 20) is provided with the transmission electrode (18 or 28) on the two joint surfaces (13 or 23) respectively, an electrical conduction relationship is between the two transmission electrodes 18, 28 of the two fans 10, 20, and at least one of the two transmission electrodes (18 or 28) has an electrical conduction relationship with the airflow generating component (12 or 22), so that one of the two transmission electrodes (18 or 28) receives external electric power or signal and transmits it to the airflow generating component (12 or 22).

Figure 16:
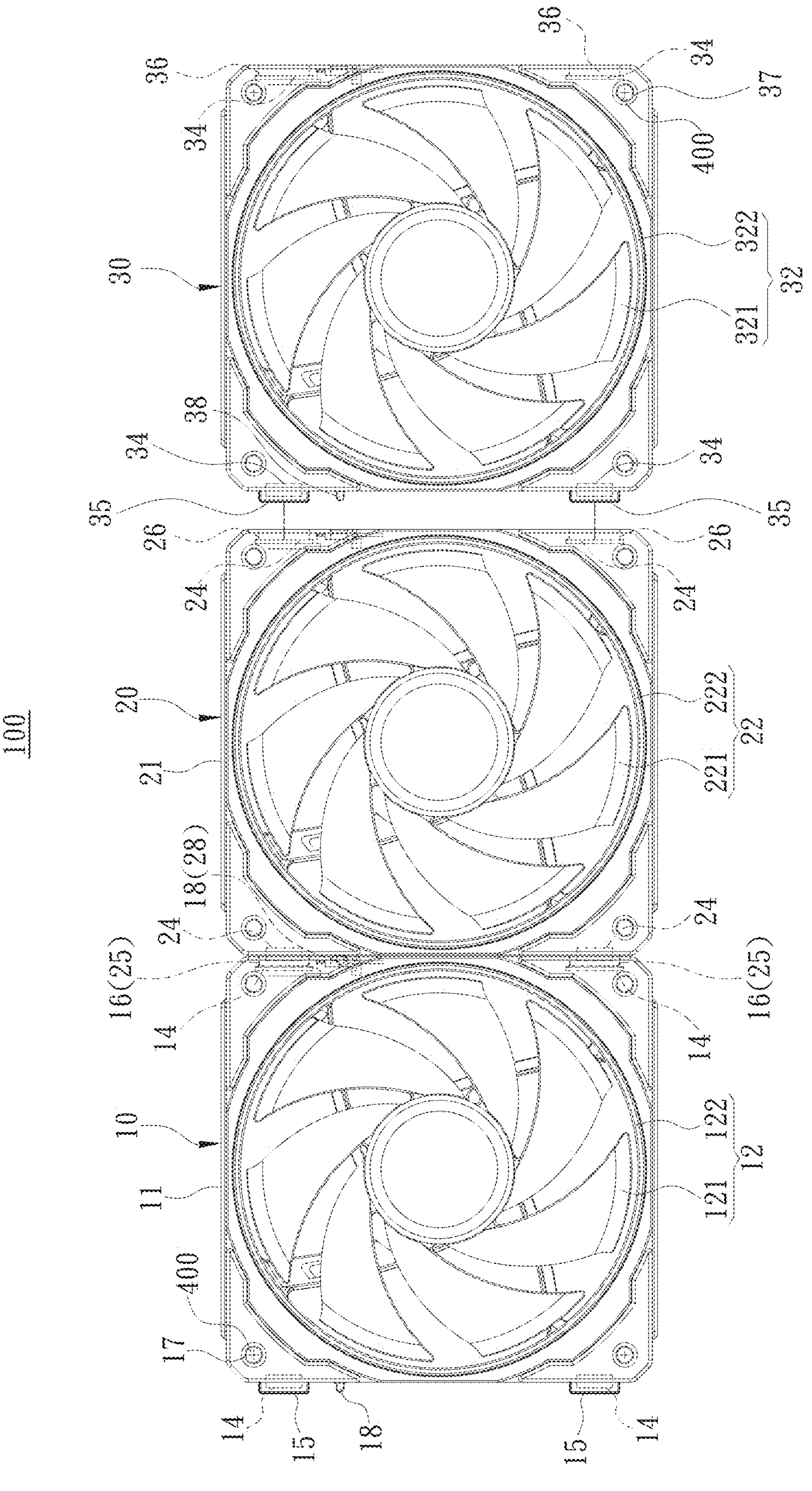
FIG. 16 is a schematic diagram of the fan set according to a tenth embodiment of the invention.
Figure 17:
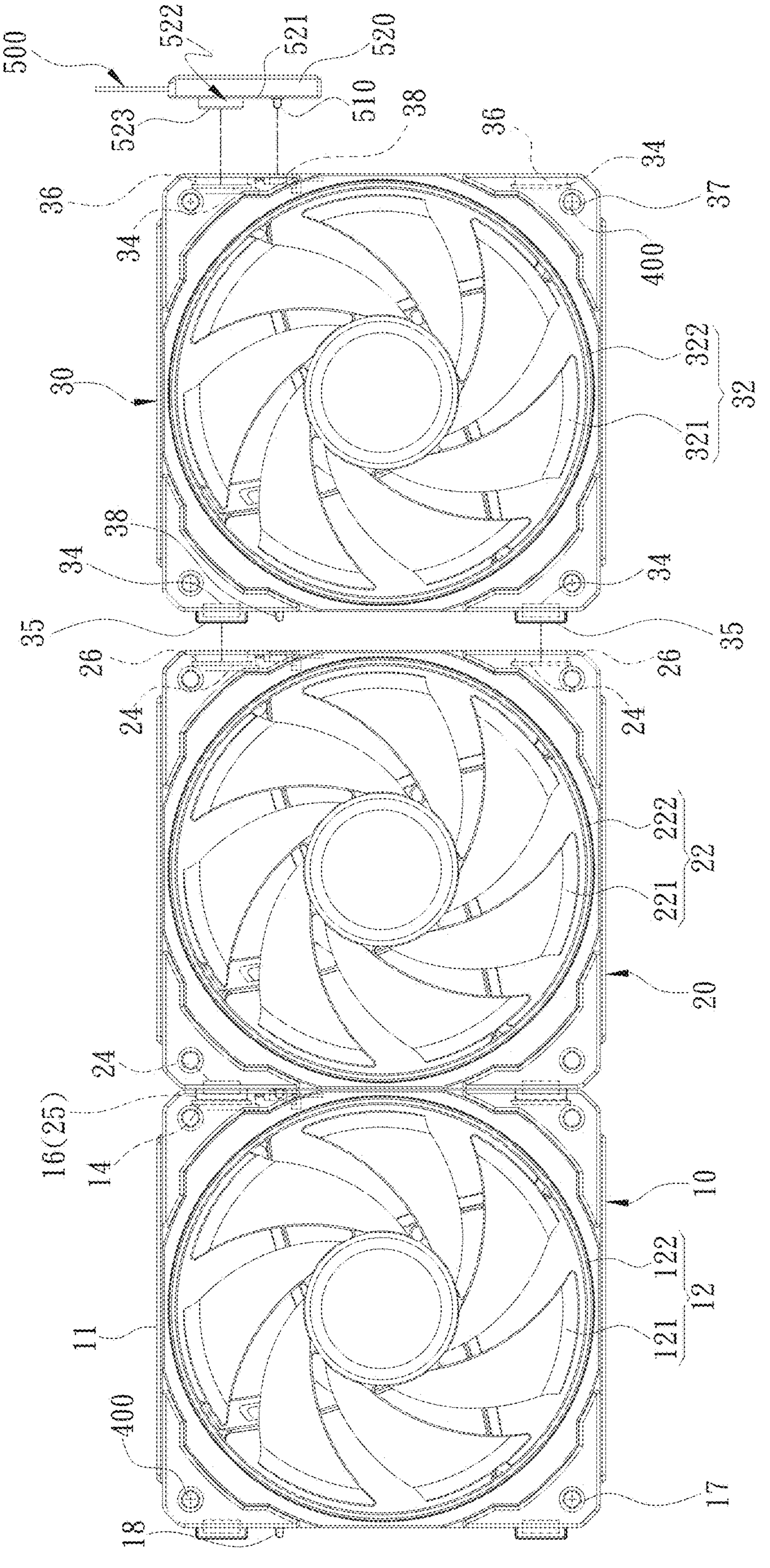
FIG. 17 is a schematic diagram of implementation of the invention with a control source.

In another embodiment, please refer to FIGS. 16 and 17, the electronic device can be used as an external electric power or signal source of the fan set 100, and the electronic device is regarded as a control source 500 by the fan set 100. The electronic device has a control source electrode 510, the control source electrode 510 is connected to the transmission electrode (18 or 28) of one of the fans (10 or 20) and transmits electric power to the aforementioned fan (10 or 20). The aforementioned fan (10 or 20) starts after receiving electric power from the electronic device, and transmits the electric power from the electronic device to the other fan (20 or 10), so that the two fans 10, 20 can receive electric power to operate.

In another embodiment, the control source electrode 510 can also transmit signals to the two fans 10, 20, the control source electrode 510 receives a signal transmitted by the control source 500 after being controlled, and transmits the signal to the transmission electrode (18 or 28) of one of the two fans 10, 20 connected to the electronic device. The aforementioned fan (10 or 20) receives the signal from the control source 500 and transmits the signal to the other fan (20 or 10), so that the two fans 10, 20 can be driven by the control source 500 to be capable of producing changes in rotation speed and light.

Further, in this embodiment, when the fan set 100 comprises the fans 10, 20, 30, the control source electrode 510 is connected to the transmission electrode (18 or 28 or 38) of the fans 10, 20, 30 at one end of the fan set 100, after receiving electric power or signal from the control source 500, the aforementioned fan (10 or 20 or 30) transmits it to the fans 10, 20, 30 which are arranged after the aforementioned fan (10 or 20 or 30), so that the fans 10, 20, 30 of the fan set 100 can be driven by the electronic device.

In more detail, in one embodiment, the electronic device has a connecting seat 520 provided with the control source electrode 510, and the connecting seat 520 is provided with a fixing member 522 on a side surface 521 provided with the control source electrode 510. When the control source electrode 510 of the connecting seat 520 is close to the transmission electrode (18 or 28) of one of the fans (10 or 20), the connecting seat 520 generates magnetic attraction with the fixing member (14 or 24) of the aforementioned fan (10 or 20) through the fixing member 522 thereof, so that the connecting seat 520 can be connected to the fan set 100. In addition, in order to improve a stability of assembly between the connecting seat 520 and the fan set 100, the connecting seat 520 of the invention is provided with a convex portion 523 or a concave portion (not shown in the figures) at a position of the fixing member 522 according to requirements, so that the convex portion 523 can be connected with the concave portion (16 or 26) of the aforementioned fan (10 or 20).

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A magnetically attracted fan set, the fan set comprising N+1 fans, the N is equal to or larger than 1, and each of the N+1 fans having a fan frame and an airflow generating component disposed on the fan frame, the magnetically attracted fan set comprising:

any two adjacent fans of the N+1 fans respectively having a joint surface, each of the joint surfaces having at least one fixing member capable of forming magnetic attraction and a transmission electrode, at least one accommodating groove being disposed on an inner side of the joint surface, and the at least one fixing member being respectively disposed in the at least one accommodating groove, wherein the two adjacent fans of the N+1 fans are configured to be jointed together by the magnetic attraction and form an electrical connection between the two adjacent fans through the two transmission electrodes when the joint surface of one of the two adjacent fans approaches the joint surface of another one of the two adjacent fans to reach a distance sufficient for the two fixing members on the two joint surfaces to form magnetic attraction, wherein the fan frame comprises two half-shells assembled with each other, each of the half-shells comprises a mounting groove, the mounting groove is provided for placing the transmission electrode, and each of the half-shells comprises a notch corresponding to the mounting groove, and the two notches jointly form an opening in which the transmission electrode is exposed after the two half-shells are assembled, wherein the mounting groove is formed on an inner surface of a half-side wall of each of the half-shells, and the half-side wall of one of the half-shells assembles with the half-side wall of another of the half-shells to form a side wall of the fan frame.

2. The magnetically attracted fan set as claimed in claim 1, wherein the two fixing members forming magnetic attraction are a magnet respectively.

3. The magnetically attracted fan set as claimed in claim 1, wherein the two fixing members forming magnetic attraction are a magnet and a metal member respectively.

4. The magnetically attracted fan set as claimed in claim 1, wherein the two fixing members and the two accommodating grooves are on the joint surface, and the two fixing members are located on two opposite sides of the joint surface and are respectively disposed in the two accommodating grooves.

5. The magnetically attracted fan set as claimed in claim 4, wherein the fan frame comprises a top plate having a first air opening, a bottom plate parallel to the top plate and having a second air opening communicating with the first air opening, wherein the top plate and the bottom plate are connected with the side wall, and the joint surface is a surface of the side wall.

6. The magnetically attracted fan set as claimed in claim 5, wherein the fan frame comprises two half-shells assembled with each other, each of the half-shells is formed with the two accommodating grooves on one side used to form the side wall.

7. The magnetically attracted fan set as claimed in claim 1, wherein each of the fans has at least one convex portion or concave portion located on the joint surface and provided for disposing the fixing member, and each of the N+1 fans capable of joining with the aforementioned fan has at least one other convex portion or concave portion located on its joint surface and capable of connecting with the aforementioned convex portion or concave portion.

8. The magnetically attracted fan set as claimed in claim 1, wherein the transmission electrode of one of the N+1 fans is a transmission pin set, and the transmission electrode of one of the N+1 fans capable of joining with the aforementioned fan is a transmission socket.

9. The magnetically attracted fan set as claimed in claim 8, wherein the transmission electrode is disposed adjacent to the fixing member.

10. The magnetically attracted fan set as claimed in claim 9, wherein the fan frame comprises a top plate having a first air opening, a bottom plate parallel to the top plate and having a second air opening communicating with the first air opening, wherein the top plate and the bottom plate are connected with the side wall, and the joint surface is a surface of the side wall.

11. The magnetically attracted fan set as claimed in claim 1, wherein the magnetically attracted fan set is connected to a control source, the control source has a control source electrode, and the transmission electrode of one of the N+1 fans at one end is connected to the control source electrode.

12. The magnetically attracted fan set as claimed in claim 1, wherein a transmission electrode is provided on the joint surface.

13. The magnetically attracted fan set as claimed in claim 12, wherein the transmission electrode of one of the N+1 fans is a transmission pin set, and the transmission electrode of one of the N+1 fans capable of joining with the aforementioned fan is a transmission socket.

14. The magnetically attracted fan set as claimed in claim 13, wherein the transmission electrode is disposed adjacent to the fixing member.

15. The magnetically attracted fan set as claimed in claim 14, wherein the magnetically attracted fan set is connected to a control source, the control source has a control source electrode, and the transmission electrode of one of the N+1 fans at one end is connected to the control source electrode.

* * * * *